United States Patent [19]

Bolin et al.

[11] 4,161,621
[45] Jul. 17, 1979

[54] SPACER MOUNT FOR A GAS INSULATED TRANSMISSION LINE

[75] Inventors: Philip C. Bolin, Westborough; Robert J. Lapen, Marlboro; Alan H. Cookson, Southborough, all of Mass.

[73] Assignee: Westinghouse Electric Corp., Pittsburgh, Pa.

[21] Appl. No.: 811,231

[22] Filed: Jun. 29, 1977

[51] Int. Cl.² ............................................. H01B 9/04
[52] U.S. Cl. ................................. 174/14 R; 174/16 B; 174/28
[58] Field of Search ................. 174/14 R, 16 B, 28, 174/29, 99 B

[56] References Cited

U.S. PATENT DOCUMENTS

| 3,448,202 | 6/1969 | Whitehead | 174/28 |
| 3,813,475 | 5/1974 | Cronin | 174/28 X |
| 3,814,831 | 6/1974 | Olsen | 174/28 |
| 3,931,451 | 1/1976 | Durschner et al. | 174/28 X |
| 3,944,716 | 3/1976 | Katzbeck | 174/28 X |
| 4,064,353 | 12/1977 | Bolin | 174/14 R |
| 4,064,354 | 12/1977 | Cookson | 174/28 |
| 4,074,064 | 2/1978 | Müller et al. | 174/28 |
| 4,085,807 | 4/1978 | Bolin | 174/14 R |
| 4,090,028 | 5/1978 | Vontobel | 174/14 R |

Primary Examiner—Arthur T. Grimley
Attorney, Agent, or Firm—M. S. Yatsko

[57] ABSTRACT

A spacer mount for use in gas insulated transmission lines is comprised of two parts, each of which has a radially inwardly extending nub, and at least one of which has a longitudinally extending section to which the other member is secured. The two nubs are spaced apart a distance substantially equal to the longitudinal width of the spacer which is mounted therebetween.

8 Claims, 3 Drawing Figures

4,161,621

SPACER MOUNT FOR A GAS INSULATED TRANSMISSION LINE

BACKGROUND OF THE INVENTION

This invention relates generally to gas-insulated equipment, and more particularly to a spacer mount for use in gas insulated transmission lines.

Gas insulated transmission lines are generally comprised of an elongated conductor which is supported centrally within a cylindrical grounded housing by means of spaced insulator supports. The interior of the outer grounded conductor is then filled with a suitable gas having desired dielectric characteristics, such as sulfur hexafluoride under pressure. The transmission line is then operated at extremely high voltages, for example, 500KV. The outer housings of the transmission line have generally small diameters, and thus create exceptionally high electric fields within the interior of the gas-filled housing. It is also known to provide conductive particle traps along the length of the transmission line, which are formed by low field intensity regions which will tend to trap conducting or semi-conducting particles once these particles reach the low field region.

Because of the high fields present within the outer housing, and because of the relatively lower dielectric strength of the insulator support, it is important to mount the insulator supports within the outer housing in such a way so as to provide an optimal electric field distribution adjacent the insulator support. This is likewise important when the insulator support not only functions to physically support the inner conductor within the outer housing, but also when these supports are utilized to provide gas tight or semi-gas tight seals between adjacent sections of the transmission line. The optimum spacer mount should be inexpensive, gas tight, electrically functional, and capable of being practically assembled. Additionally, it is desirable to minimize the number of external seals required within the line, and to avoid the necessity of utilizing flanges for joining members together.

SUMMARY OF THE INVENTION

In accordance with the present invention, it has been found that a more desirable gas-insulated transmission line is provided which comprises an elongated, cylindrical outer sheath and an elongated inner conductor disposed within the outer sheath. An insulating gas electrically insulates the inner conductor from the outer sheath, and insulating spaces are disposed within the outer sheath for insulatably supporting the inner conductor wthin the outer sheath. A spacer mount mounts the spacer within the outer sheath, and comprises an annular first member having a longitudinally extending section and a radially inwardly extending nub, and an annular second member which has a radially inwardly extending nub. The second member is secured to the first member at the first members longitudinal section, and the first and second nubs are spaced apart a distance substantially the same as the spacer longitudinal width. The first member nub, the second member nub, and the first member longitudinal section form an annular space therebetween, and the spacer is disposed within the annular space.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
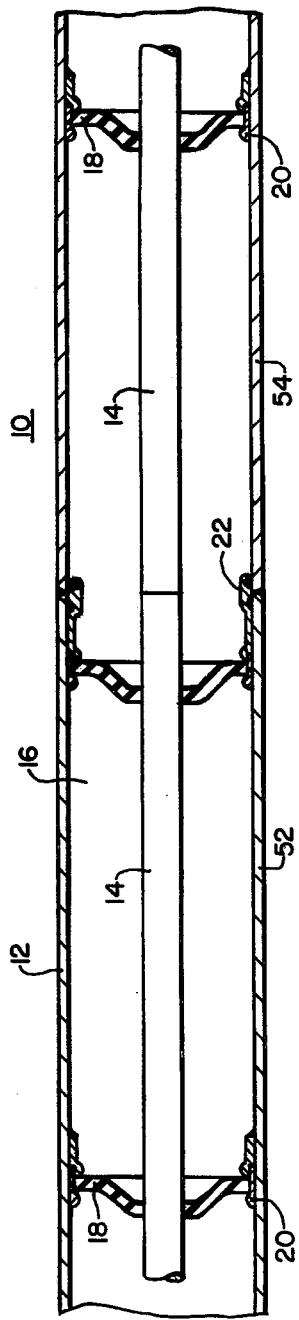
FIG. 1 is an elevational view of a typical gas insulated transmission line utilizing the teachings of this invention.

Referring now more particularly to FIG. 1, therein is illustrated a gas-insulated transmission line 10 constructed according to the teachings of this invention. The transmission line 10 is comprised of an elongated, cylindrical outer sheath 12, and an elongated inner conductor 14 disposed within the outer sheath 12. The outer sheath 12 and the inner conductor 14 are both of a good, electrically conducting material such as aluminum, and the inner conductor 14 is typically at a high-voltage with respect to the grounded outer sheath 12. Disposed within the outer sheath 12 and electrically insulating the inner conductor 14 from the outer sheath 12 is an insulating gas 16 typical of which is sulfur hexafluoride at a pressure of 45 pounds per square inch. Insulatably supporting the inner conductor 14 within the outer sheath 12 are a plurality of spaced insulating spaces 18 which, as illustrated, are of conical shape. This conical shape of the spacer 18 provides for an increased withstand capablity of the spacer 18, but the invention may be utilized with spacers of a, for example, circular or disc configuration. Mounting the spacers 18 within the outer sheath 12 are a plurality of spacer mounts 20, 22, which depending upon their configuration, may be utilized for varying purposes in addition providing a mount for the insulating spacers 18.

Figure 2:
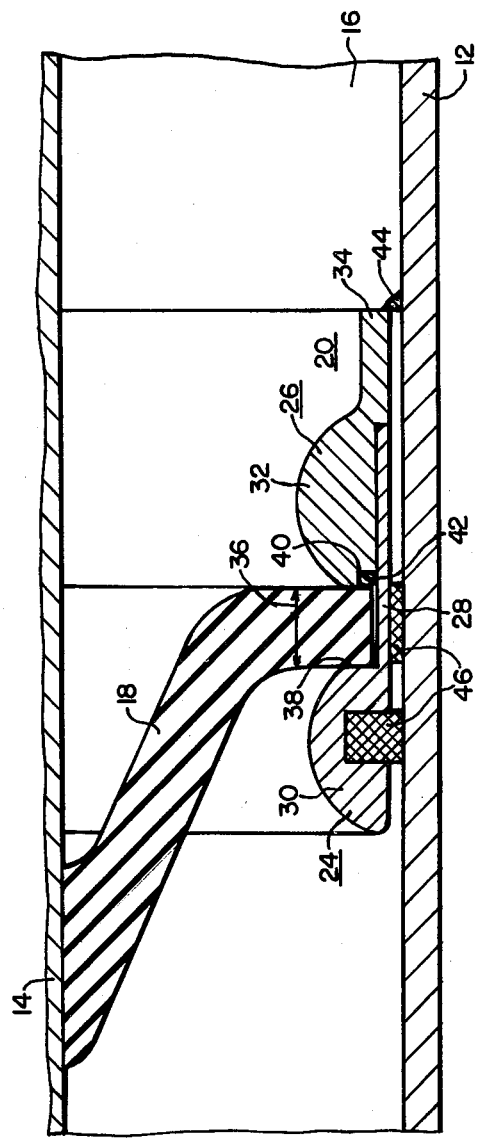
FIG. 2 is a detailed view of the spacer mount utilized in FIG. 1.

IN FIG. 2, therein is illustrated a detailed view of the spacer mount 20. This spacer mount 20 is comprised of an annular first member 24 and an annular second member 26. The first member 24 has two sections: a longitudinally extending section 28 and a radially-inwardly extending nub 30, which two sections 28, 30 are intergrally formed. The second member 26 is comprised of a radially-inwardly extending nub 32 and a longitudinally extending section 34. The second member 26 is secured to the longitudinal section 28 of the other member 24, by means such as welding, with the two nubs 30, 32 been spaced apart from each other a distance substantially equal to the longitudinal width 36 of the insulating spacer 18. The first nub 30, the second nub 32, and the longitudinal section 28 form an annular space 38 therebetween, and disposed within the annular space 38 is the insulating spacer 18. Disposed within a slot 40 in the nub 32 intermediate the insulating spacer 18 and the nub 32 is a compressible face seal 42 which typically is an O-ring seal. Physically securing the spacer mount 20 the outer sheath 12 are securing means such as the weld 44. The weld 44 functions to prevent longitudinal movement of the spacer mount 20 and the insulating spacer 18 held thereby upon, for example, thermal expansion of the outer sheath 12 and the inner conductor 14. Also, to maintain the spacer mount 20 in a spaced apart relationship with the outer sheath 12, a spacer pad or pads 46 are disposed intermediate the first member 24 and the outer sheath 12. One of the spacer pads 46 may be of a filter material to allow gas to flow across the spacer 18.

As can be appreciated, the spacer mount 20 provides a means for not only mounting the spacer 18, but also provides a gas-tight barrier across the insulating spacer 18. The weld 44 and the O-ring 42 provide seals to prevent the insulating gas 16 from flowing from, for example, the right side of the spacer 18 to the left side of the spacer 18 as shown in the drawings. A variation of this mount, which would allow the passage of gas but prohibit the propagation of breakdown products in the unlikely event of a transmission line breakdown, would be to provide holes (not shown) in the longitudinal section 34 of the second member 26. These holes would allow gas to flow past the spacer 18, but would not allow the passage of breakdown products.

Figure 3:
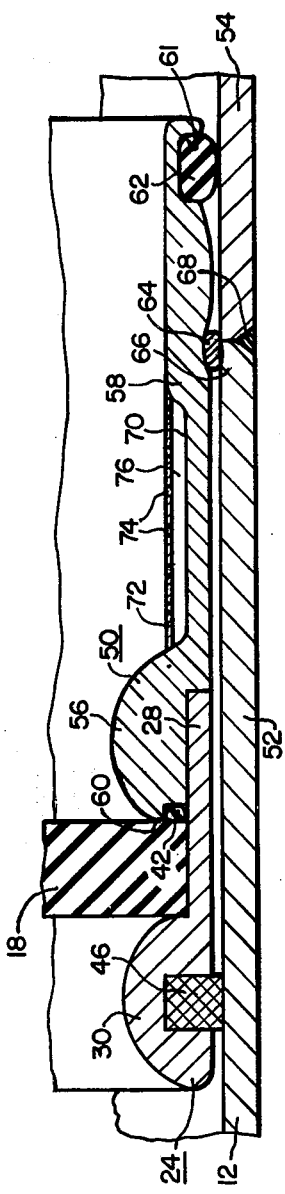
FIG. 3 is a detailed view of a modification of the mount illustrated in FIG. 2.

The typical gas insulated transmission line 10 is formed from a plurality of individual sections which are secured together in the field to form the line. Each section is typically from 40 to 60 feet in length, and at the jointure of two adjacent sections, it is desirable to provide a welding backup ring to prohibit the entrance of weld spatter inside the outer sheath. The spacer mount 22, a modification of the spacer 20, may be desirable for use where two individual outer sheath sections 52, 54 are joined together. In FIG. 3, the spacer mount 22 is comprised of first and second annular members 24, 50, respectively. The first member 24 is similar to that described in connection with FIG. 2, in that the member 24 has a nub 30, a longitudinal section 28, and a spacer pad 46 associated therewith. The second member 50 has a radially-inwardly extending nub 56, and a longitudinally extending section 58 integrally formed therewith. The two nubs 30, 56 are longitudinally spaced apart, as in FIG. 2, a distance substantially equal to the longitudinal width 36 of the spacer 18, with the spacer 18 being disposed within the annular space 60 formed between the nubs 30, 56 and the longitudinal extension 28. In this modification, though, the longitudinal extension 58 of the second member 50 is a welding backup ring. The welding backup ring 58 has an annular groove 61 therein adjacent the outer sheath 12, and more particularly the sheath section 54, and the groove 61 is longitudinally distal from the second member nut 56. A seal 62, which typically may be an O-ring seal, is disposed within the grove 61 of the backup ring 58, and ths seal 62 contacts both the backup ring 58 and the sheath sector 54. The seal 62 functions to prohibit any weld splatter from entering into the transmission line 10. The spacer pad 46, in this modification, likewise prevents weld splatter from entering the transmission line 10. The spacer mount 22 is secured to the outer sheath 12 by means such as the weld 64, which advantageously may be at the end 66 of the sheath sector 52, and may be made prior to joining the sheath sectors 52, 54 together. Being thus located, whenever the weld 68 is made to join the sheath sectors 52, 54, the longitudinal extension 58 provides the required backup for the weld 68.

The presence of conducting or semiconducting particles within the outer sheath 12 may function to lower the breakdown strength of the insulating gas 16, and initiate breakdown of the transmission line 10 earlier than would otherwise occur in the absence of such particles. To deactivate these particles, it is common in transmission lines to provide low field regions for the entrapment of particles therein. These low field regions are advantageously positioned adjacent the insulating supports 18, for it is across the supports 18 that flashover and breakdown will occur if the conducting particles are disposed thereon. Therefore, the spacer mount 22 incorporates therein a low field region for the entrapment of conducting or semiconducting particles. The second member 50, at its longitudinal extension 58, has a depressed area 70 therein. An electrode 72, having a plurality of apertures 74 therein, is connected to the second member nub 56 and the second member longitudinal section 58, and the electrode 72 is spaced apart from the depressed region 70 to form a low field region 76 therebetween. This low field region 76 provides a trap for any conducting or semiconducting particles which may pass through the apertures 74 into the region 76. Although not shown, a particle trap may be secured to, and extend outwardly from, nub 30.

Thus, it can be seen that this invention describes a transmission line which utilizes an inexpensive, electrically functional, and practically assembled spacer mount for mounting the insulating spacers within the outer sheath.

We claim as our invention:

1. A gas-insulated transmission line comprising:
   an elongated, cylindrical outer sheath;
   an elongated inner conductor disposed within said outer sheath;
   an insulating gas disposed within said outer sheath an electrically insulating said inner conductor from said outer sheath;
   an insulating spacer having a longitudinal width disposed within said outer sheath and insulatably supporting said inner conductor within said outer sheath; and
   a metallic spacer mount for mounting said spacer within said outer sheath comprising;
   an annular first member having a longitudinally extending section and a radially-inwardly extending nub; and
   an annular second member having a radially-inwardly extending nub, said second member being secured to said first member at said first member longitudinal section, said first and second member nubs being spaced-apart a distance substantially the same as said spacer width, said first member nub, said second member nub, and said first member longitudinal section forming an annular space therebetween, said spacer being disposed within said annular space, said spaced mount being secured to said outer sheath.

2. The gas-insulated transmission line according to claim 1 wherein said spacer is of a conical shape.

3. The gas-insulated transmission line according to claim 1 including means for securing said spacer mount to said outer sheath.

4. The gas-insulated transmission line according to claim 1 including a seal disposed within said annular space intermediate said spacer and said second member nub.

5. The gas-insulated transmission line according to claim 1 including a spacer pad disposed intermediate said spacer mount and said outer sheath and maintaining said spacer mount in a spaced-apart relationship with said outer sheath.

6. The gas-insulated transmission line according to claim 1 wherein said second member has a longitudinally extending section extending longitudinally from said second member nub, said second member longitudinal section having an annular groove therein adjacent said outer sheath and distal from said second member nub, and a seal is disposed within said groove and contacts said outer sheath.

7. The gas-insulated transmission line according to claim 6 wherein said outer sheath is comprised of a plurality of longitudinal outer sheath segments welded together, and said second member longitudinal section is longitudinally opposite the joint between two outer sheath segments, said second member longitudinal section being a welding backup ring.

8. The gas-insulated transmission line according to claim 7 including an apertured electrode connected to said second member nub and said second member longitudinal section and spaced apart from said second member longitudinal section at some portion thereof, said electrode and said second member longitudinal section forming a low-field region therebetween for the entrapment of particles therein.

* * * * *